(12) United States Patent
Uchihashi et al.

(10) Patent No.: US 10,494,132 B2
(45) Date of Patent: Dec. 3, 2019

(54) DELAMINATION CONTAINER

(71) Applicant: KYORAKU CO., LTD., Kyoto (JP)

(72) Inventors: Kentaro Uchihashi, Kanagawa (JP); Tetsuaki Eguchi, Kanagawa (JP); Shinsuke Taruno, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 15/771,265

(22) PCT Filed: Oct. 28, 2016

(86) PCT No.: PCT/JP2016/082041
§ 371 (c)(1),
(2) Date: Apr. 27, 2018

(87) PCT Pub. No.: WO2017/073721
PCT Pub. Date: May 4, 2017

(65) Prior Publication Data
US 2018/0312290 A1    Nov. 1, 2018

(30) Foreign Application Priority Data

Oct. 30, 2015 (JP) ................................. 2015-215261
Mar. 25, 2016 (JP) ................................. 2016-062563

(51) Int. Cl.
*B65D 1/02* (2006.01)
*B32B 27/08* (2006.01)
(Continued)

(52) U.S. Cl.
CPC ................ *B65D 1/02* (2013.01); *B32B 27/08* (2013.01); *B32B 27/302* (2013.01);
(Continued)

(58) Field of Classification Search
CPC .... B65D 1/02; B65D 83/0055; B32B 27/302; B32B 27/306; B32B 27/325
See application file for complete search history.

(56) References Cited

U.S. PATENT DOCUMENTS 5,301,838 A * 4/1994 Schmidt ............... B67D 1/0462
222/105
5,509,738 A 4/1996 Haynes et al.
(Continued)

FOREIGN PATENT DOCUMENTS

JP     S56-92058 A    7/1981
JP     H10-129792 A   5/1998
(Continued)

OTHER PUBLICATIONS

Partial Search Report dated Oct. 15, 2018 in corresponding European Application No. 16859949.6; 11 pages.
(Continued)

*Primary Examiner* — Jeremy Carroll
(74) *Attorney, Agent, or Firm* — Maier & Maier, PLLC

(57) ABSTRACT

A delaminatable container is provided that is excellent in all of squeezability, drop breaking resistance, and non-transmittance of water vapor. The present invention provides a delaminatable container, comprising a container body having an outer shell and an inner bag, the inner bag to be shrunk with a decrease in contents, wherein the inner bag is composed of an inner layer including a mixed resin layer formed of a mixed resin containing a cycloolefin polymer and a styrene-based thermoplastic elastomer.

9 Claims, 11 Drawing Sheets

(51) Int. Cl.
  *B32B 27/30* (2006.01)
  *B32B 27/32* (2006.01)
  *B65D 83/00* (2006.01)
(52) U.S. Cl.
  CPC .......... *B32B 27/306* (2013.01); *B32B 27/325* (2013.01); *B65D 83/0055* (2013.01); *B32B 2270/00* (2013.01); *B32B 2274/00* (2013.01); *B32B 2307/558* (2013.01); *B32B 2307/7246* (2013.01); *B32B 2307/732* (2013.01); *B32B 2439/40* (2013.01); *B32B 2439/46* (2013.01); *B32B 2439/80* (2013.01)

(56) References Cited

U.S. PATENT DOCUMENTS

| | | | |
|---|---|---|---|
| 6,266,943 B1 | 7/2001 | Nomoto et al. | |
| 6,581,803 B1 * | 6/2003 | Yoshimoto | B65D 83/0055 222/105 |
| 7,867,434 B2 | 1/2011 | Iwahashi et al. | |
| 8,091,730 B2 * | 1/2012 | Keefe | A47G 19/2272 220/203.18 |
| 2001/0027154 A1 | 10/2001 | Nomoto et al. | |
| 2004/0112921 A1 | 6/2004 | Nomoto et al. | |
| 2005/0058792 A1 | 3/2005 | Iwatsubo | |
| 2006/0054635 A1 * | 3/2006 | Iwahashi | A61F 9/0008 222/107 |
| 2012/0021151 A1 * | 1/2012 | Tatarka | B32B 1/08 428/35.1 |
| 2014/0141223 A1 * | 5/2014 | Yoda | B32B 27/18 428/216 |
| 2016/0052661 A1 * | 2/2016 | Furusawa | B65D 1/0215 215/12.2 |
| 2017/0029156 A1 | 2/2017 | Eguchi et al. | |

FOREIGN PATENT DOCUMENTS

| | | |
|---|---|---|
| JP | 2005-75414 A | 3/2005 |
| JP | 3650175 B2 | 5/2005 |
| JP | 2012-116516 A | 6/2012 |
| JP | 2015-163531 A | 9/2015 |

OTHER PUBLICATIONS

International Search Report dated Dec. 20, 2016 of corresponding International application No. PCT/JP2016/082041; 6 pgs.

\* cited by examiner

Fig. 2A
Fig. 2D B-B SECTIONAL VIEW
Fig. 2B
Fig. 2C A-A SECTIONAL VIEW
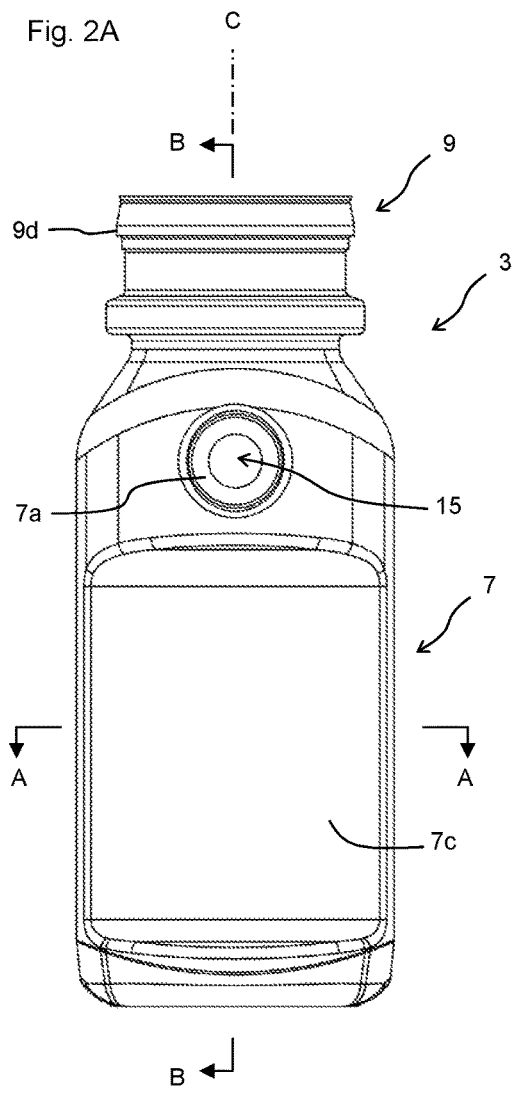
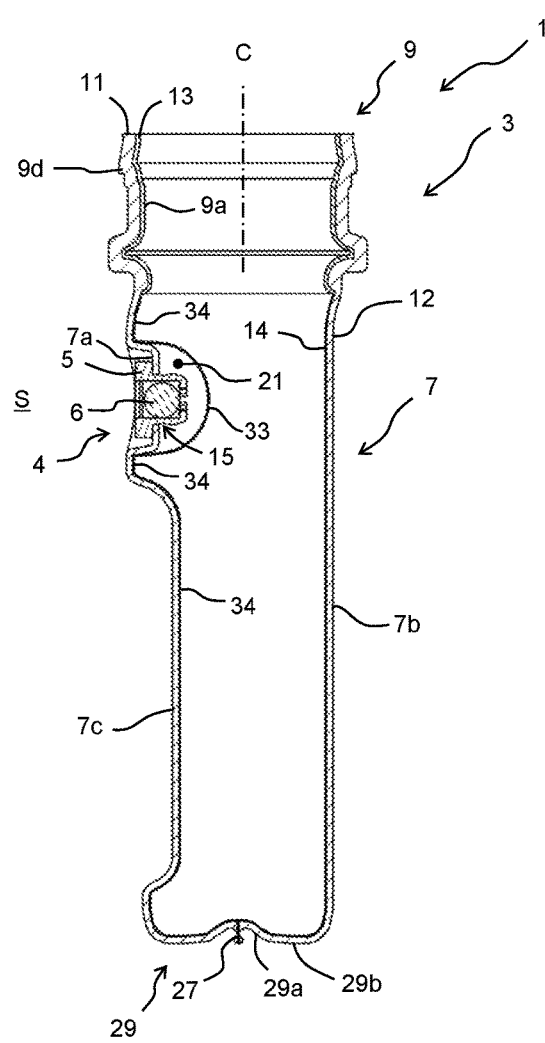
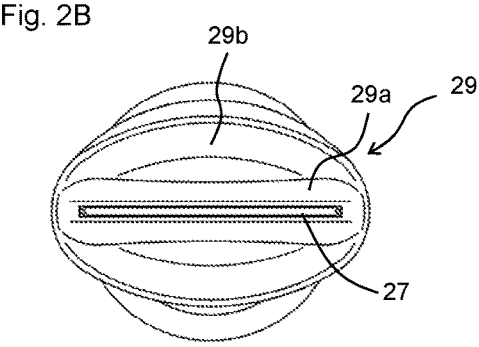
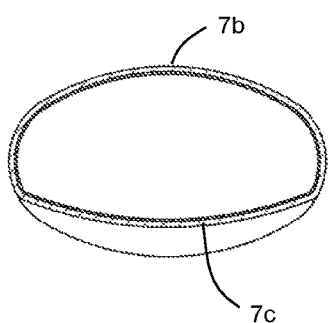

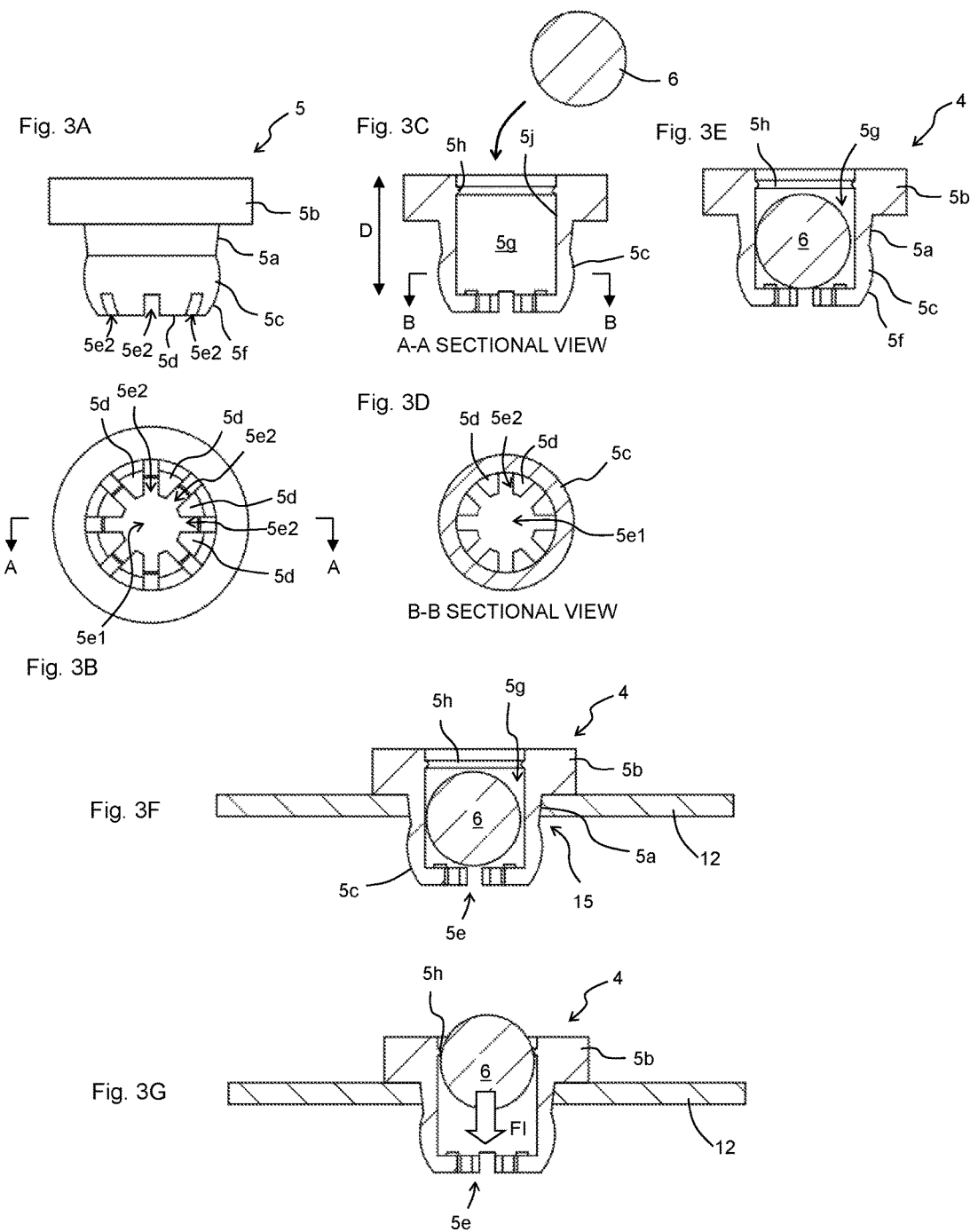

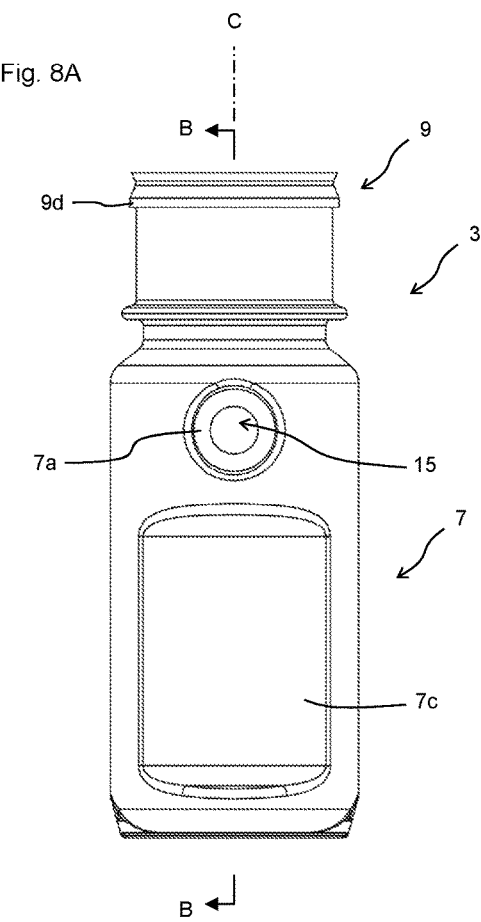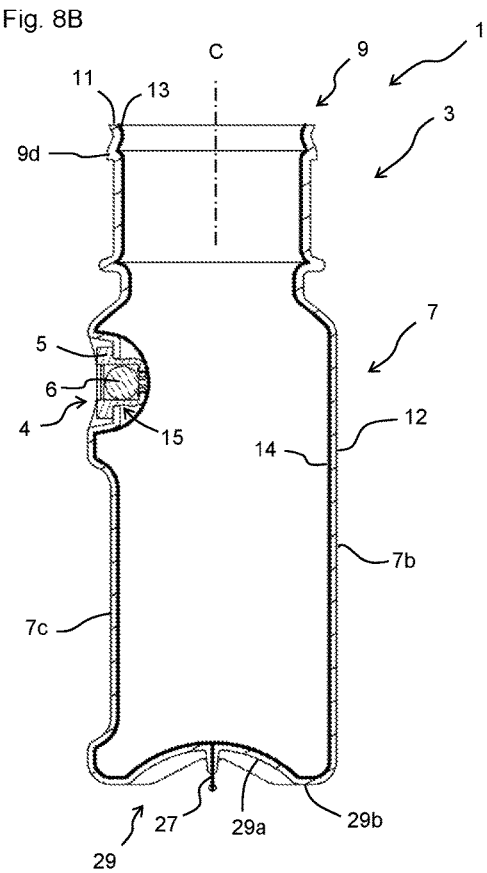

Fig. 10  B-B SECTIONAL VIEW

DELAMINATION CONTAINER

FIELD

The present invention relates to a delaminatable container.

BACKGROUND

There are known delaminatable containers including a container body having an outer shell and an inner bag, the inner bag to be shrunk with a decrease in contents (e.g., PTLs 1 and 2).
PTL 1: JP 2005-75414A
PTL 2: Japanese Patent No. 3650175.

SUMMARY OF INVENTION

First Aspect

Such a delaminatable container sometimes requires a small squeezing force for discharge of the contents (squeezability), less likelihood of breaking when the container is dropped (drop breaking resistance), less likelihood of water vapor transmission (non-transmittance of water vapor), and the like. An inner bag of a delaminatable container is generally formed with a very thin thickness to be immediately shrunk for discharge of the contents. Accordingly, problems that drop breaking resistance and non-transmittance of water vapor are not good are prone to arise. In contrast, when the thickness of the inner bag is greater to increase the drop breaking resistance and the non-transmittance of water vapor, the squeezability is prone to be worse. It is accordingly not easy to make all of the squeezability, the drop breaking resistance, and the non-transmittance of water vapor in good condition.

The first aspect of the present invention has been made in view of such circumstances and is to provide a delaminatable container excellent in all of squeezability, drop breaking resistance, and non-transmittance of water vapor.

Second Aspect

A delaminatable container sometimes stores pharmaceuticals, such as eye drops. In this case, the upper limit of an amount of water vapor transmission of the delaminatable container is defined by the standards of the pharmacopoeia. The present inventors performed an experiment on such a delaminatable container as disclosed in PTL 1 and found that such a delaminatable container is sometimes not allowed to be used as a pharmaceutical container because the amount of water vapor transmission exceeded the upper limit.

The second aspect of the present invention has been made in view of such circumstances and is to provide a delaminatable container capable of reducing the amount of water vapor transmission.

A description is given below to solutions to the problems in the first to second aspects. The solutions in the first to second aspects below may be combined with each other.

First Aspect

The first aspect of the present invention provides a delaminatable container, including a container body having an outer shell and an inner bag, the inner bag to be shrunk with a decrease in contents, wherein the inner bag is composed of an inner layer including a mixed resin layer formed of a mixed resin containing a cycloolefin polymer and a styrene-based thermoplastic elastomer.

The present inventors made various investigations on a resin contained in the inner layer and found that all of the squeezability, the drop breaking resistance, and the non-transmittance of water vapor were good when the inner layer constituting the inner bag included a mixed resin layer formed of a mixed resin containing a cycloolefin polymer and a styrene-based thermoplastic elastomer, and thus have come to complete the present invention.

Second Aspect

The second aspect of the present invention provides a delaminatable container, including a container body having an outer shell and an inner bag, the inner bag delaminated from the outer shell to be shrunk with a decrease in contents, wherein the outer shell includes a fresh air inlet communicating an external space of the container body with an intermediate space between the outer shell and the inner bag, and an undelaminated region where the inner bag is not delaminated from the outer shell is provided to surround the fresh air inlet.

The present inventors conducted a research on the cause of the large amount of water vapor transmission of the delaminatable container and found that, in a container subjected to preliminary delamination as in PTL 1, a gap was created between an inner layer and an outer layer during the preliminary delamination and the inner layer was in communication with an external space through this gap and a fresh air inlet, and thus moisture from the contents in the container leaked outside through the inner layer, the gap, and the fresh air inlet, causing an increase in the amount of water vapor transmission.

They then found based on the findings that an area of the inner layer in communication with the external space was reduced by providing an undelaminated region to surround the fresh air inlet, and as a result, the amount of water vapor transmission was successively reduced, and thus have come to complete the present invention.

Various embodiments of the present invention are described below as examples. The embodiments below may be combined with each other.

Preferably, the inner bag is composed of an inner layer including a mixed resin layer formed of a mixed resin containing a cycloolefin polymer and a styrene-based thermoplastic elastomer.

Preferably, in the mixed resin, a mass ratio of the styrene-based thermoplastic elastomer to the cycloolefin polymer is from 0.1 to 2.

Preferably, the styrene-based thermoplastic elastomer is formed of a hydrogenated styrene-based copolymer.

Preferably, the hydrogenated styrene-based copolymer contains a styrene-ethylene butylene-styrene block copolymer.

Preferably, the inner layer includes an EVOH layer formed of an EVOH resin in the exterior of the container from the mixed resin layer.

Preferably, the above container further includes a cover to close the fresh air inlet.

Preferably, the above container further includes a valve member to regulate entrance and exit of air between the intermediate space and the external space.

Preferably, the above container further includes an inlet peripheral delaminated region, where the inner bag is delaminated from the outer shell, between the undelaminated region and the fresh air inlet.

Preferably, the undelaminated region is provided in an interface region, other than the inlet peripheral delaminated region, between the outer shell and the inner bag.

Preferably, the above container further includes a separated delaminated region where the inner bag is delaminated from the outer shell, wherein the undelaminated region is provided between the separated delaminated region and the fresh air inlet.

Preferably, a value of (an area of the inlet peripheral delaminated region)/(an area of an interface region between the outer shell and the inner bag) is 0.8 or less.

Preferably, the container body includes a storage portion to store the contents and a mouth to discharge the contents from the storage portion, the fresh air inlet is provided in the storage portion.

BRIEF DESCRIPTION OF DRAWINGS

FIGS. 2A and 2B are, respectively, a front view and a bottom view of the container body 3 in FIG. 1, FIG. 2C is an A-A cross-sectional view in FIG. 2A, and FIG. 2D is a B-B cross-sectional view in FIG. 2A in a state of mounting a valve member 4 to the container body 3.

FIG. 3A is a front view of a tube 5, FIG. 3B is a bottom view of the tube 5, FIG. 3C is an A-A cross-sectional view in FIG. 3B, FIG. 3D is a B-B cross-sectional view in FIG. 3C, FIG. 3E is a cross-sectional view of the valve member 4, FIG. 3F is a cross-sectional view illustrating a state of mounting the valve member 4 to an outer shell 12, and FIG. 3G is a cross-sectional view illustrating a state where a mobile part 6 abuts on a stopper 5$h$ to close a cavity 5$g$.

FIG. 8A is a front view of the container body 3 in FIG. 7 and FIG. 8B is a B-B cross-sectional view in FIG. 8A in a state of mounting a valve member 4 to the container body 3.

DESCRIPTION OF EMBODIMENTS

Embodiments of the present invention are described below. Various characteristics in the embodiments described below may be combined with each other. Each characteristic is independently inventive.

Figure 1:
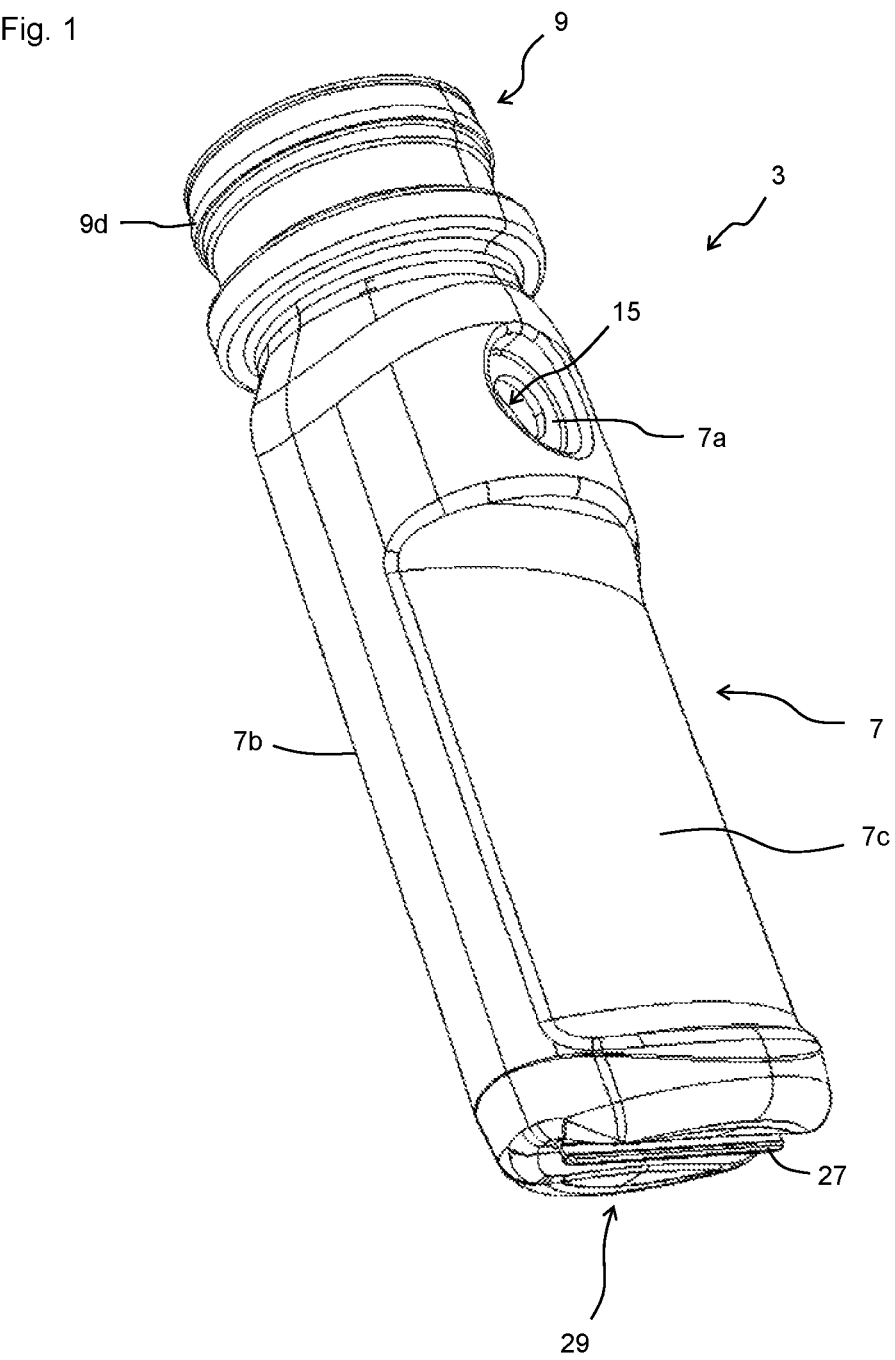
FIG. 1 is a perspective view of a container body 3 of a delaminatable container 1 in one embodiment of the present invention.

As illustrated in FIGS. 1 to 2D, a delaminatable container 1 in one embodiment of the present invention is provided with a container body 3 and a valve member 4. The container body 3 is provided with a storage portion 7 to store the contents and a mouth 9 to discharge the contents from the storage portion 7.

As illustrated in FIGS. 2A to 2D, the container body 3 includes an outer layer 11 and an inner layer 13 in the storage portion 7 and the mouth 9, where the outer layer 11 constitutes an outer shell 12 and the inner layer 13 constitutes an inner bag 14. Due to delamination of the inner layer 13 from the outer layer 11 with a decrease in the contents, the inner bag 14 delaminates from the outer shell 12 to be shrunk.

Figure 9:
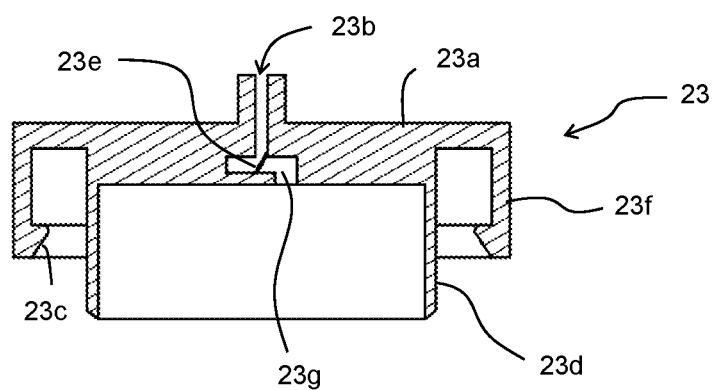
FIG. 9 is a cross-sectional view corresponding to line C in FIGS. 8A and 8B illustrating an example of a cap 23 mounted to a mouth 9 of the container body 3.
Figure 10:
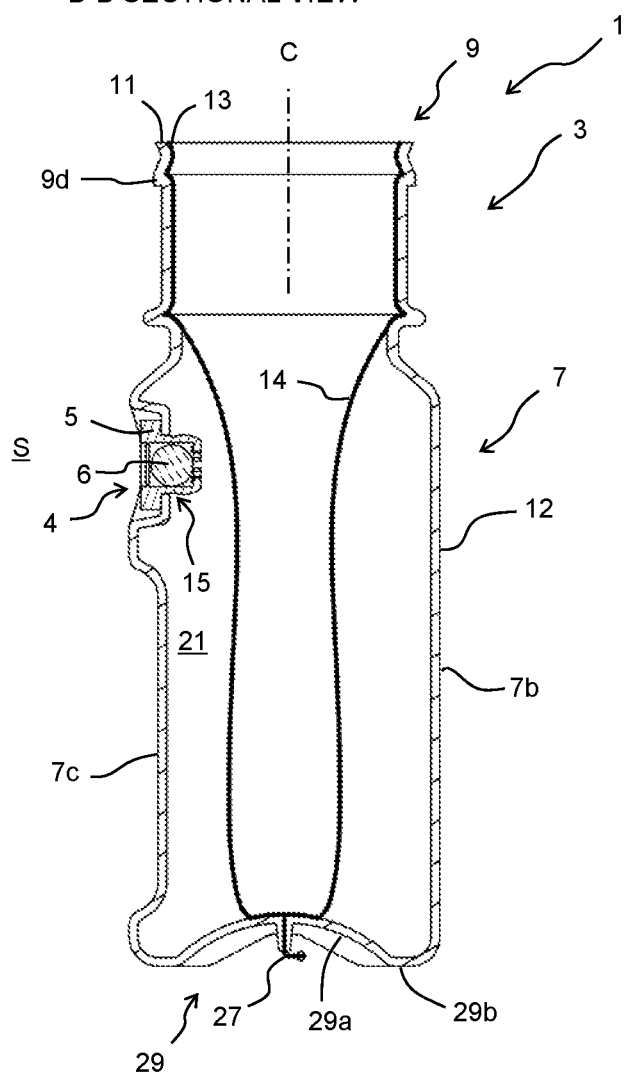
FIG. 10 is a cross-sectional view corresponding to line C in FIGS. 8A and 8B in a state where a bottom seal protrusion 27 is bent and the inner bag 14 is shrunk.

The mouth 9 is provided with an engagement section 9$d$ engageable with a cap 23 exemplified in FIG. 9. In the present embodiment, the mouth 9 is assumed to have a press-fit cap mounted thereto, and the engagement section 9$d$ is a ring-shaped projection to be engaged with an engagement section of the cap. Note that a cap, a pump, or the like with an internal thread may be mounted to the mouth 9, and in such a case, the engagement section 9$d$ is configured with an external thread. As illustrated in FIG. 9, the cap 23 includes a body portion 23$a$, an outlet 23$b$ provided in the body portion 23$a$, the engagement section 23$c$ provided at an approximate end of an outer circumference portion 23$f$ cylindrically extending from the body portion 23$a$, an inner ring 23$d$ cylindrically extending from the body portion 23$a$ inside the outer circumference portion 23$f$, a flow passage 23$g$ provided inside the inner ring 23$d$ and communicating with the outlet 23$b$, and a check valve 23$e$ provided in the flow passage 23$g$. While the cap 23 is mounted to the mouth 9, the contents in the storage portion 7 are discharged from the outlet 23$b$ through the flow passage 23$g$. Meanwhile, the check valve 23$e$ blocks an incoming flow of fresh air from the outlet 23$b$, and fresh air does not enter inside the inner bag 14 of the container body 3 to inhibit content degradation. The structure of the cap 23 described here is merely an example, and for example, a cap 23 having a check valve of another configuration may be employed.

As illustrated in FIGS. 1 to 2D, the storage portion 7 has a tubular portion 7$b$ in a tubular shape with an approximately elliptical cross section and a panel portion 7$c$ formed by depressing a portion of the tubular portion 7$b$. Since the container body 3 is formed by blow molding of a tubular (e.g., cylindrical) laminated parison, the container body 3 has a smaller thickness in an area at a greater blow ratio (an area more distant from the central axis C). Since the panel portion 7$c$ is closer to the central axis C than the tubular portion 7$b$, it has a greater thickness than that of the tubular portion 7$b$. The panel portion 7$c$ accordingly has greater rigidity than that of the tubular portion 7$b$. As illustrated in FIGS. 7 to 8B and 10, the storage portion 7 may be in a shape having a tubular portion 7$b$ in a tubular shape with an approximately circular cross section and a panel portion 7$c$ formed by depressing a portion of the tubular portion 7$b$.

As illustrated in FIGS. 1 to 2D, the outer shell 12 includes a fresh air inlet 15, in the storage portion 7, communicating an external space S of the container body 3 with an intermediate space 21 between the outer shell 12 and the inner bag 14. Specifically, the fresh air inlet 15 is provided in a position adjacent to the panel portion 7$c$ (more specifically, in a region between the panel portion 7$c$ and the mouth 9).

As illustrated in FIGS. 2A to 2D, in the periphery of the fresh air inlet 15, the inner bag 14 is delaminated from the outer shell 12 to form an inlet peripheral delaminated region 33. In a region other than the inlet peripheral delaminated region 33 within an interface region I between the outer shell 12 and the inner bag 14, the inner bag 14 is not delaminated from the outer shell 12 to make an undelaminated region 34. The undelaminated region 34 is accordingly provided to surround the inlet peripheral delaminated region 33 and the fresh air inlet 15. The undelaminated region 34 is essentially provided in the second aspect of the present invention, whereas the undelaminated region 34 is not necessary in the first aspect of the present invention. Preliminary delamination to delaminate the inner layer 13 from the outer layer 11 before storage of the contents in the storage portion 7 is not performed in the undelaminated region 34 in the second aspect of the present invention, whereas preliminary delamination may be performed in an arbitrary area in the first aspect of the present invention because the undelaminated region 34 is not essential. In this case, the inner layer 13 is contacted with the outer layer 11 by blowing air or storing the contents in the storage portion 7 after preliminary delamination. The inner layer 13 then separates from the outer layer 11 with a decrease in the contents. Meanwhile, when preliminary delamination is not performed, the inner layer 13 is delaminated from the outer layer 11 in discharge of the contents to separate from the outer layer 11.

Since the inner bag 14 is delaminated from the outer shell 12 in the inlet peripheral delaminated region 33, the intermediate space 21 is provided between them. Meanwhile, since the inner bag 14 is not delaminated from the outer shell 12 in the undelaminated region 34, no intermediate space 21 is formed between them. The state where "the inner bag 14 is not delaminated from the outer shell 12" is a state of the outer shell 12 and the inner bag as produced by blow molding the container body 3 using a laminated parison having a laminated structure corresponding to the inner bag 14 and the outer shell 12. The state where "the inner bag 14 is delaminated from the outer shell 12" is a state where, by applying some external force to the container body 3 produced by blow molding, the inner bag 14 is displaced from the outer shell 12 in a thickness direction for removal or the inner bag 14 and the outer shell 12 are shifted in an in-plane direction to release the adhered state between the inner bag 14 and the outer shell 12.

The intermediate space 21 is in communication with the external space S through the fresh air inlet 15. Accordingly, when the moisture from the contents is transmitted through the inner bag 14, the moisture is readily released to the external space S. Since the inner bag 14 generally has a smaller thickness than that of the outer shell 12, it is prone to transmit moisture more than the outer shell 12. Accordingly, a greater area of the inlet peripheral delaminated region 33 causes a greater area of the inner bag 14 exposed to the intermediate space 21 and thus a greater amount of water vapor transmission from inside the container body 3 to the external space S.

Accordingly, a smaller ratio of the area of the inlet peripheral delaminated region 33 to the area of the interface region I allows more reduction in the amount of water vapor transmission. The inlet peripheral delaminated region 33 does not have to be provided when not needed. In this case, the area of the inlet peripheral delaminated region 33 is 0. A value P of (area of the inlet peripheral delaminated region 33)/(area of the interface region I) is preferably 0.8 or less and more preferably 0.5 or less. Specifically, this value P is, for example, 0, 0.01, 0.05, 0.1, 0.2, 0.3, 0.4, 0.5, 0.6, 0.7, and 0.8 or it may be in a range between any two values exemplified here.

Although the value P as small as possible is preferred from the perspective of reducing the amount of water vapor transmission, the value P is preferably 0.01 or more and more preferably 0.05 or more because, when the valve member 4 is inserted into the fresh air inlet 15, an excessively small value P causes collision of the valve member 4 with the inner bag 14 in insertion of the valve member 4, leading to easy damage of the inner bag 14.

The inlet peripheral delaminated region 33 may be formed by, before injection of the contents into the storage portion 7, injecting a fluid (gas, liquid) between the outer shell 12 and the inner bag 14 from the fresh air inlet 15 or pressing the inner bag 14 inside with a rod inserted into the fresh air inlet 15 for separation (preliminary delamination) of the inner bag 14 from the outer shell 12. By changing the amount of the injected fluid or the amount of pressing, the value P can be varied.

Although the region other than the inlet peripheral delaminated region 33 in the interface region I is defined as the undelaminated region 34 in the present embodiment, a separated delaminated region where the inner bag 14 is delaminated from the outer shell 12 may be provided in addition to the inlet peripheral delaminated region 33 or instead of the inlet peripheral delaminated region 33. The separated delaminated region is provided in a position separated from the fresh air inlet 15, and the undelaminated region 34 is arranged between the separated delaminated region and the fresh air inlet 15. When the inlet peripheral delaminated region 33 is provided, the inlet peripheral delaminated region 33 and the separated delaminated region are divided by the undelaminated region 34. As just described, the separated delaminated region is separated from the fresh air inlet 15 by the undelaminated region 34, and thus the moisture transmitted through the inner bag 14 in the separated delaminated region is not readily released to the external space S.

An excessively large ratio of the undelaminated region 34 to the interface region I may cause difficulty in delamination of the inner bag 14 from the outer shell 12 when the contents are discharged from the container. By providing the separated delaminated region, the ratio of the undelaminated region 34 to the interface region I becomes smaller and an effect of facilitating delamination of the inner bag 14 from the outer shell 12 is thus obtained. The separated delaminated region may be formed by, for example, forming a through hole separate from the fresh air inlet 15 and injecting a fluid (gas, liquid) from the hole or pressing a rod into the fresh air inlet 15 to separate the inner bag 14 from the outer shell 12. The through hole is preferably sealed after formation of the separated delaminated region. As another example, without forming a through hole, the separated delaminated region may be formed by applying an external force to the container body 3 to shift the inner bag 14 and the outer shell 12 in an in-plane direction.

In the present embodiment, the fresh air inlet 15 includes the valve member 4 to regulate entrance and exit of air between the intermediate space 21 and the external space S. The valve member 4 is mounted to a valve member mounting recess 7a provided in the storage portion 7. When the storage portion 7 is compressed, the valve member 4 of is closed to block an air flow from the intermediate space 21 to the external space S and thus has a function of increasing the pressure in the intermediate space 21 to facilitate transmission of the pressure exerted on the outer shell 12 to the inner bag 14. In contrast, when the compressive force applied to the storage portion 7 is released, the valve member 4 is opened and has a function of passing therethrough the air from the external space S to the intermediate space 21. Accordingly, fresh air is introduced into the intermediate space 21 and the outer shell 12 smoothly restores its original shape.

The valve member 4 may have a function of opening and closing the fresh air inlet 15, and the configuration examples include a configuration where the valve member 4 itself is provided with a through hole and an on-off valve, which acts to open and close the through hole for opening and closing of the fresh air inlet 15 and a configuration where a gap between the valve member 4 and an edge of the fresh air inlet 15 is opened and closed by movement of the valve member 4 for opening and closing of the fresh air inlet 15 by the valve member 4. The former valve member 4 is suitably applied in particular to a small container, such as a pharmaceutical (e.g., eye drop) container, because the valve member 4 functions with no problem even when the size of the fresh air inlet 15 is somewhat varied.

Here, with reference to FIGS. 3A to 3G, an example of the valve member 4 is described. The valve member 4 is provided with a tube 5 having a cavity 5g provided to communicate the external space S with the intermediate space 21 and a mobile part 6 movably stored in the cavity 5g. The tube 5 and the mobile part 6 are formed by injection molding or the like, and the mobile part 6 is disposed in the cavity 5g by pressing the mobile part 6 into the cavity 5g to pass over a stopper 5h described later. In the present embodiment, the cavity 5g has an approximately cylindrical shape and the mobile part 6 has an approximately spherical shape while they may have another shape as long as the shape is capable of achieving same functions as those in the present embodiment. The cavity 5g has a diameter in a horizontal cross section (cross section in FIG. 3D) slightly larger than the diameter in a corresponding cross section of the mobile part 6 and has a shape allowing the mobile part 6 to freely move in arrow D directions in FIG. 3C. A value of the ratio defined by the diameter of the cavity 5g in the horizontal cross section/the diameter of the mobile part 6 in the corresponding cross section is preferably from 1.01 to 1.2 and more preferably from 1.05 to 1.15. This is because a too small value of the ratio causes interference with smooth movement of the mobile part 6 and a too large value of the ratio causes an excessive increase in the gap between the mobile part 6 and a surface 5j surrounding the cavity 5g and thus an insufficient force tends to be applied to the mobile part 6 for compression of the container body 3.

The tube 5 has a stem 5a disposed in the fresh air inlet 15, a locking portion 5b provided on the external space S side of the stem 5a and preventing entrance of the tube 5 into the intermediate space 21, and a diametrically expanded portion 5c provided on the intermediate space 21 side of the stem 5a and preventing drawing of the tube 5 from outside the container body 3. The stem 5a has a tapered shape towards the intermediate space 21 side. That is, the stem 5a has an outer circumferential surface providing a tapered surface. The outer circumferential surface of the stem 5a closely contacts with an edge of the fresh air inlet 15 to mount the tube 5 to the container body 3. Such configuration allows reduction in the gap between the tube 5 and the edge of the fresh air inlet 15, and as a result, when the container body 3 is compressed, it is possible to inhibit outflow of the air in the intermediate space 21 from the gap between the tube 5 and the edge of the fresh air inlet 15. The tube 5 is mounted to the container body 3 by making the outer circumferential surface of the stem 5a close contact with the edge of the fresh air inlet 15, and the diametrically expanded portion 5c is thus not essential.

The surface 5j surrounding the cavity 5g is provided with a stopper 5h to lock the mobile part 6 in movement of the mobile part 6 from the intermediate space 21 side towards the external space S side. The stopper 5h is configured with an annular projection, and when the mobile part 6 abuts on the stopper 5h, to block air communication through the cavity 5g.

The tube 5 has an end providing a flat surface 5d, and the flat surface 5d is provided with an opening 5e in communication with the cavity 5g. The opening 5e has an approximately circular central opening 5e1 provided at the center of the flat surface 5d and a plurality of slits 5e2 radially extending from the central opening 5e1. Such configuration does not interfere with air flow even when the mobile part 6 abuts on the bottom of the cavity 5g.

As illustrated in FIG. 3F, when the valve member 4 is inserted into the fresh air inlet 15 from the diametrically expanded portion 5c side and the locking portion 5b is pressed into a position to abut on an outer surface of the outer shell 12, the outer circumferential surface of the stem 5a is held in the outer shell 12 in close contact with the edge of the fresh air inlet 15. When the outer shell 12 is compressed while air is in the intermediate space 21, the air in the intermediate space 21 enters into the cavity 5g through the opening 5e and causes the mobile part 6 to be lifted and abut on the stopper 5h. When the mobile part 6 abuts on the stopper 5h, the air flow through the cavity 5g is blocked.

When the outer shell 12 is further compressed in this state, the pressure in the intermediate space 21 is increased, and as a result, the inner bag 14 is compressed to discharge the contents in the inner bag 14. When the compressive force to the outer shell 12 is released, the outer shell 12 attempts to restore its shape by the elasticity of its own. The pressure in the intermediate space 21 is reduced with the restoration of the outer shell 12, and as illustrated in FIG. 3G, a force FI in direction inside the container is applied to the mobile part 6. This causes the mobile part 6 to move towards the bottom of the cavity 5g to the state illustrated in FIG. 3F, and fresh air is thus introduced in the intermediate space 21 through the opening 5e and the gap between the mobile part 6 and the surface 5j.

The valve member 4 is allowed to be mounted to the container body 3 by inserting the diametrically expanded portion 5c into the intermediate space 21 while pressing and expanding the fresh air inlet 15 by the diametrically expanded portion 5c. The diametrically expanded portion 5c thus has an end preferably in a tapered shape. Being mounted only by pressing the diametrically expanded portion 5c into the intermediate space 21 from outside the container body 3, such valve member 4 is excellent in productivity. Since the tube 5 has an end provided with the flat surface 5d, the inner bag 14 is not easily damaged even when the valve member 4 is pressed into the intermediate space 21 and the end of the valve member 4 collides with the inner bag 14. In addition, since the fresh air inlet 15 is provided with the inlet peripheral delaminated region 33 in the periphery, damage of the inner bag 14 due to collision by the valve member 4 when the valve member 4 is pressed into the intermediate space 21 is inhibited more effectively.

The moisture of the contents in the inner bag 14 is released to the external space S through the inner bag 14, the intermediate space 21, and the fresh air inlet 15. Accordingly, by providing a cover to close the fresh air inlet 15 during storage of the delaminatable container 1 filled with the contents, release of the moisture in the intermediate space 21 to the external space S is inhibited, allowing reduction in the amount of water vapor transmission of the delaminatable container 1. The cover may be removed during use of the delaminatable container 1 to open the fresh air inlet 15 and introduce fresh air into the intermediate space 21. The cover preferably includes a layer formed of a material with low moisture transmittance (e.g., metal, such as aluminum).

Figure 4A:
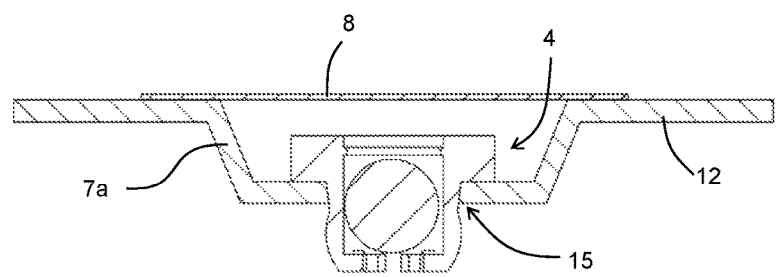
FIGS. 4A-4C are cross-sectional views illustrating an example of using a sealing member 8 as a cover.
Figure 4B:
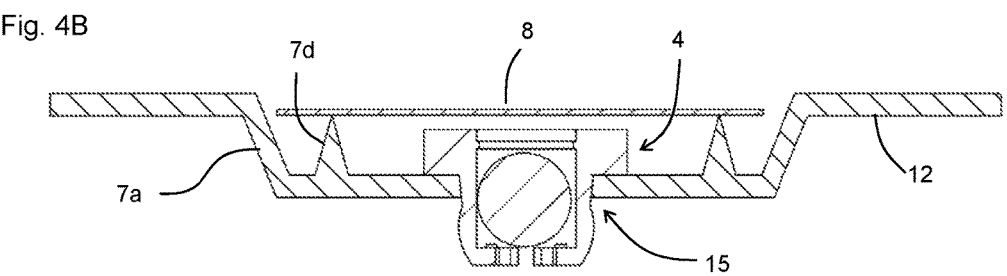
Figure 4C:
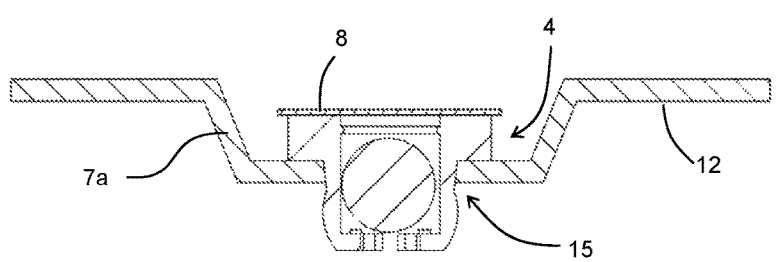
Figure 5:
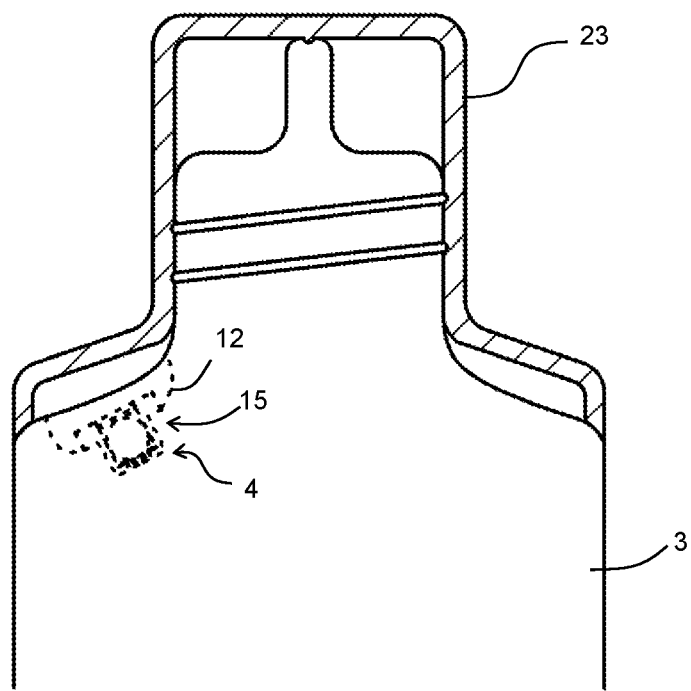
FIG. 5 is a front view illustrating an example of using a cap 23 as the cover.

As illustrated in FIGS. 4A to 4C, specific configuration examples of the cover include a configuration of providing a sealing member 8 to be adhered around the valve member 4 and the fresh air inlet 15. In the example of FIG. 4A, the sealing member 8 is pasted provided surrounding the valve member mounting recess 7a. In the example of FIG. 4B, the sealing member 8 is pasted over an annular convexity 7d provided surrounding the valve member 4 and the fresh air inlet 15 in the valve member mounting recess 7*a*. In the example of FIG. 4C, the sealing member 8 is pasted to the valve member 4 to close the cavity 5*g* of the valve member 4. Another configuration example of the cover includes, as illustrated in FIG. 5, covering around the valve member 4 and the fresh air inlet 15 with the cap 23. In this case, the cap 23 becomes the cover. Except the configuration example in FIG. 4C, the valve member 4 may be omitted.

As illustrated in FIGS. 1 to 2D, the storage portion 7 has a bottom surface 29 with a recessed region 29*a* and a peripheral region 29*b* provided to sandwich the recessed region 29*a*. In the recessed region 29*a*, as illustrated in FIGS. 2A to 2D, a bottom sealing portion 27 is provided that protrudes from the bottom surface 29. Bending of the bottom seal protrusion 27 allows improvement in the impact resistance of the container body 3 and improvement in the self-supportability of the container body 3.

The layer structure of the container body 3 is described below in further detail. The container body 3 is provided with the outer layer 11 and the inner layer 13. The outer layer 11 is formed thicker than the inner layer 13 for better restorability.

Figure 6:
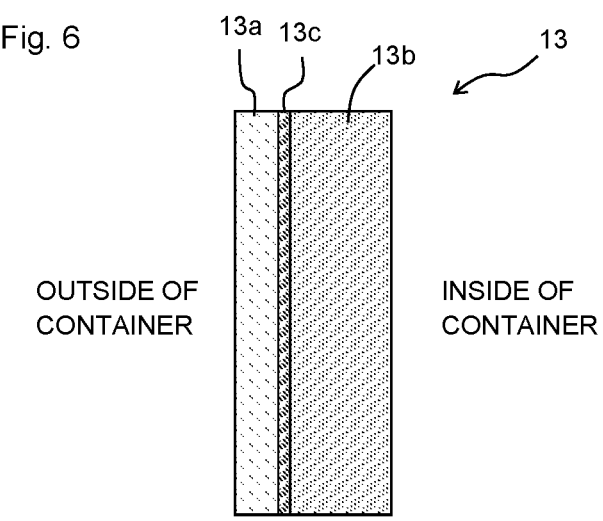
FIG. 6 is a cross-sectional view illustrating a structure of an inner layer 13.

As illustrated in FIG. 6, in the present embodiment, the inner layer 13 includes an EVOH layer 13*a* provided on the outer surface side of the container, an inner surface layer 13*b* provided on an inner surface side of the container from the EVOH layer 13*a*, and an adhesion layer 13*c* provided between the EVOH layer 13*a* and the inner surface layer 13*b*. By providing the EVOH layer 13*a*, the oxygen barrier properties and the delamination properties from the outer layer 11 are improved. The adhesion layer 13*c* may be omitted.

The EVOH layer 13*a* is a layer containing an ethylene-vinyl alcohol copolymer (EVOH) resin and is obtained by hydrolysis of a copolymer of ethylene and vinyl acetate. The EVOH resin has an ethylene content, for example, from 25 to 50 mol %, and from the perspective of oxygen barrier properties, it is preferably 32 mol % or less. Although not particularly defined, the lower limit of the ethylene content is preferably 25 mol % or more because the flexibility of the EVOH layer 13*a* is prone to decrease when the ethylene content is less. The EVOH layer 13*a* preferably contains an oxygen absorbent. The content of an oxygen absorbent in the EVOH layer further improves the oxygen barrier properties of the EVOH layer 13*a*.

The inner surface layer 13*b* is a layer in contact with the contents of the delaminatable container 1. It contains, for example, polyolefin, such as low-density polyethylene, linear low-density polyethylene, high-density polyethylene, polypropylene, an ethylene-propylene copolymer, and a mixture thereof, and preferably low-density polyethylene or linear low-density polyethylene. The resin contained in the inner surface layer 13*b* preferably has a tensile modulus of elasticity from 50 to 300 MPa and more preferably from 70 to 200 MPa. This is because the inner surface layer 13*b* is particularly flexible when the tensile modulus of elasticity is in such a range. Specifically, the tensile modulus of elasticity is, for example, specifically for example, 50, 100, 150, 200, 250, and 300 Mpa or it may be in a range between any two values exemplified here.

The adhesion layer 13*c* is a layer having a function of adhering the outside layer 13*a* to the inside layer 13*b*, and it is, for example, a product of adding acid modified polyolefin (e.g., maleic anhydride modified polyethylene) with carboxyl groups introduced therein to polyolefin described above or an ethylene-vinyl acetate copolymer (EVA). An example of the adhesion layer 13*c* is a mixture of acid modified polyethylene with low-density polyethylene or linear low-density polyethylene.

The outer layer 11 is formed of, for example, low-density polyethylene, linear low-density polyethylene, high-density polyethylene, polypropylene, an ethylene-propylene copolymer, a mixture thereof, or the like. The outer layer 11 preferably includes a repro layer, which is formed of a material using burrs generated during molding of the container body 3 by recycling. The outer layer 11 preferably has the repro layer with both sides sandwiched by cover layers. The cover layers are formed of, for example, low-density polyethylene, linear low-density polyethylene, high-density polyethylene, polypropylene, an ethylene-propylene copolymer, a mixture thereof, or the like. For a container having a diameter of 30 mm or less, the outer layer 11 is preferably formed to contain low-density polyethylene. Such configuration facilitates squeeze to discharge the contained liquid. For example, the outer layer 11 may be composed of a single layer of low-density polyethylene. As another example, the outer layer 11 may be composed of a multilayer of low-density polyethylene and a recycled material using burrs generated during molding.

Polypropylene used for the outer layer 11 or the inner layer 13 may be any of a propylene homopolymer, a propylene random copolymer, and a propylene block copolymer while a propylene random copolymer, with better transparency than that of a propylene homopolymer or a propylene block copolymer, is particularly preferably used for delaminatable containers where the transparency is valued as in the present embodiment. Such a propylene random copolymer is a random copolymer of propylene and another monomer and has a content of the monomer other than propylene of less than 50 mol %, preferably from 5 to 35 mol %. Specifically, the content is, for example, 5, 10, 15, 20, 25, and 30 mol % or it may be in a range between any two values exemplified here. As the monomer to be copolymerized with propylene, ethylene is particularly preferred. In the case of a propylene-ethylene random copolymer, the ethylene content is preferably from 5 to 30 mol % and specifically, for example, 5, 10, 15, 20, 25, and 30 mol % or it may be in a range between any two values exemplified here.

Figure 11:
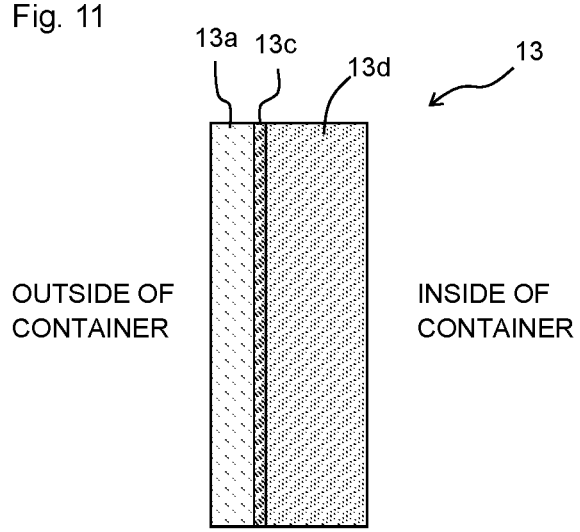
FIG. 11 is a cross-sectional view illustrating another structure of the inner layer 13.

As illustrated in FIG. 11, the inner layer 13 may include an EVOH layer 13*a* provided on the outer surface side of the container, a mixed resin layer 13*d* provided on the inner surface side of the container from the EVOH layer 13*a*, and an adhesion layer 13*c* provided between the EVOH layer 13*a* and the mixed resin layer 13*d*. The descriptions on the EVOH layer 13*a* and the adhesion layer 13*c* are as above.

The mixed resin layer 13*d* is formed of a mixed resin containing a cycloolefin polymer and a styrene-based thermoplastic elastomer. By containing the mixed resin layer 13*d* formed using such a mixed resin in the inner layer 13, the squeezability, the drop breaking resistance, and the non-transmittance of water vapor are increased. Since a cycloolefin polymer has low adsorption of chemicals, use of the mixed resin layer 13*d* as an innermost layer in the inner layer 13 allows inhibition of adsorption of chemicals by the inner layer 13.

The mixed resin contained in the mixed resin layer 13*d* has a tensile modulus of elasticity measured in accordance with ISO 527 preferably from 800 to 2000 MPa and more preferably from 900 to 1900 MPa. Specifically, the tensile modulus of elasticity is, for example, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, and 2000 MPa or it may be in a range between any two values exemplified here. A too large tensile modulus of elasticity of the mixed resin tends to cause worse squeezability.

Such a cycloolefin polymer is a polymer having an alicyclic structure in a main chain and/or a side chain. Examples of the alicyclic structure of the polymer include a saturated cyclic hydrocarbon (cycloalkane) structure, an unsaturated cyclic hydrocarbon (cycloalkene) structure, and the like. Among them, from the perspective of mechanical strength, heat resistance, and the like, a cycloalkane structure and a cycloalkene structure are preferred and a cycloalkane structure is most preferred.

The number of carbon atoms contained in the alicyclic structure is, but not particularly limited to, generally from 4 to 30, preferably from 5 to 20, and more preferably from 5 to 15 for highly balanced properties of mechanical strength, heat resistance, and moldability.

The ratio of repeating units having an alicyclic structure in the cycloolefin polymer may be appropriately selected in accordance with the purpose of use, and it is generally 50 mass % or more, preferably 70 mass % or more, and more preferably 90 mass % or more. An excessively low ratio of repeating units having an alicyclic structure in the cycloolefin polymer is not preferred because the transparency and the heat resistance are worse.

The rest of the cycloolefin polymer other than the repeating units having an alicyclic structure is not particularly limited and is appropriately selected in accordance with the purpose of use.

A specific example of the cycloolefin polymer includes a norbornene-based polymer. Such a norbornene-based polymer is a known polymer disclosed in, for example, JP 3-14882A, JP 3-122137A, and the like, and specific examples include a ring-opening polymer of a norbornene-based monomer, an addition polymer of a norbornene-based monomer, an addition copolymer of a norbornene-based monomer and a vinyl compound, a hydrogenated product thereof, and the like.

Such a norbornene-based monomer is a monomer having a norbornene ring structure in the molecule, and specific examples include bicyclo[2.2.1]-hepta-2-ene, 5-ethylidene-bicyclo[2.2.1]-hepta-2-ene, tricyclo[4.3.0.12,5]-deca-3,7-diene, and the like. Such a norbornene-based monomer may be composed of each single type or more types in combination.

Such a vinyl compound is not particularly limited as long as it is copolymerizable with the norbornene-based monomer. Examples of the vinyl compound include: ethylene having a carbon number from 2 to 20 or α-olefin, such as ethylene, propylene, and 1-hexene; cycloolefin, such as cyclobutene, cyclopentene, cyclohexene, and cyclooctene; disconjugate diene, such as 1,4-hexadiene and 1,7-octadiene; and the like. Such a vinyl compound may be composed of each single type or more types in combination.

The cycloolefin polymer has a melt flow rate (MFR) at 230° C. preferably from 3 to 20 g/10 min and more preferably from 5 to 15 g/10 min. Specifically, the MFR is, for example, 3, 4, 5, 6, 7, 8, 9, 10, 11, 12, 13, 14, 15, 16, 17, 18, 19, and 20 or it may be in a range between any two values exemplified here. The MFR may be measured in accordance with ISO 1133.

The cycloolefin polymer has a tensile modulus of elasticity measured in accordance with ISO 527 preferably from 1500 to 2500 MPa and more preferably from 1700 to 2100 MPa. Specifically, the tensile modulus of elasticity is, for example, 1500, 1600, 1700, 1800, 1900, 2000, 2100, 2200, 2300, 2400, and 2500 or it may be in a range between any two values exemplified here.

The cycloolefin polymer has a tensile strength measured in accordance with ISO 527 preferably from 10 to 100 MPa, more preferably from 20 to 80 MPa, and even more preferably from 30 to 60 MPa. Specifically, the tensile strength is, for example, 10, 15, 20, 25, 30, 35, 40, 45, 50, 55, 60, 65, 70, 75, 80, 85, 90, 95, and 100 MPa or it may be in a range between any two values exemplified here.

The cycloolefin polymer has a bending modulus of elasticity measured in accordance with ISO 178 preferably from 1500 to 2500 MPa and more preferably from 1700 to 2100 MPa. Specifically, the bending modulus of elasticity is, for example, 1500, 1600, 1700, 1800, 1900, 2000, 2100, 2200, 2300, 2400, and 2500 or it may be in a range between any two values exemplified here.

Such a styrene-based thermoplastic elastomer is a thermoplastic elastomer having styrene units. Examples of the elastomer include a single one or a blend of two or more selected from styrene-based copolymers (e.g., a styrene-ethylene-styrene block copolymer (SES), a styrene-butadiene-styrene block copolymer (SBS), a styrene-isoprene-styrene block copolymer (SIS), styrene-butadiene rubber (SBR), etc.), hydrogenated styrene-based copolymers (e.g., a styrene-ethylene propylene-styrene block copolymer (SEPS), a styrene-ethylene butylene-styrene block copolymer (SEBS), a styrene-butylene butadiene-styrene block copolymer (SBBS), hydrogenated styrene-butadiene rubber (HSBR), etc.), and the like. Among them, hydrogenated styrene-based copolymers are preferred and SEBS is particularly preferred.

When the styrene-based thermoplastic elastomer is a block copolymer, a mass ratio of the styrene block to the non-styrene block (e.g., the ethylene butylene block in SEBS) is preferably from 0.1 to 10, more preferably from 0.2 to 5, and even more preferably from 0.5 to 2. Specifically, the mass ratio is, for example, 0.1, 0.2, 0.3, 0.4, 0.5, 0.6, 0.7, 0.8, 0.9, 1, 1.5, 2, 2.5, 3, 4, 5, 6, 7, 8, 9, and 10 or it may be in a range between any two values exemplified here.

The styrene-based thermoplastic elastomer has a melt flow rate (MFR) at 230° C. preferably from 0.3 to 10 g/10 min., more preferably from 0.4 to 5 g/10 min, and even more preferably from 0.6 to 3 g/10 min. Specifically, the MFR is, for example, 0.3, 0.4, 0.5, 0.6, 0.7, 0.8, 0.9, 1, 1.1, 1.2, 1.3, 1.4, 1.5, 2, 3, 4, 5, 6, 7, 8, 9, and 10 or it may be in a range between any two values exemplified here. The MFR may be measured in accordance with ISO 1133.

The styrene-based thermoplastic elastomer has a tensile strength measured in accordance with ISO 37 preferably from 10 to 80 MPa and more preferably from 15 to 60 MPa. Specifically, the tensile strength is, for example, 10, 15, 20, 25, 30, 35, 40, 45, 50, 55, 60, 65, 70, 75, and 80 MPa or it may be in a range between any two values exemplified here.

A mass ratio of the styrene-based thermoplastic elastomer to the cycloolefin polymer (elastomer ratio) is preferably from 0.1 to 2 and more preferably from 0.25 to 1. The mass ratio may be 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, and 2 or it may be in a range between any two values exemplified here.

On the inner surface side of the container from the mixed resin layer 13d, another inner surface layer may be provided. As such an inner surface layer, for example, a layer formed of the above cycloolefin polymer. Since a cycloolefin polymer has low adsorption of chemicals, a cycloolefin polymer layer may be provided inside from the mixed resin layer 13d for even lower adsorption of chemicals. A cycloolefin polymer layer with a greater thickness tends to cause worse squeezability, and thus a thickness ratio of the cycloolefin polymer layer to the mixed resin layer is preferably from 0.1 to 1 and more preferably from 0.1 to 0.5. Specifically, the thickness ratio is, for example, 0.1, 0.2, 0.3, 0.4, 0.5, 0.6, 0.7, 0.8, 0.9, and 1 or it may be in a range between any two values exemplified here.

The present invention is allowed to be carried out in the following embodiments.

- Although provided in the storage portion 7 in the above embodiment, the fresh air inlet 15 may be provided in the mouth 9. In this case, a check valve may be built in a cap to be mounted to the mouth 9. In this case, an inlet peripheral delaminated region is not necessary.
- The valve member 4 may be omitted. In this case, the contents are allowed to be discharged by closing the fresh air inlet 15 with a finger or the like when the contents are discharged or by greatly deforming the outer shell 12 and directly pressing the inner bag 14 by the outer shell 12 for discharge of the contents.

EXAMPLES

Examples below are to demonstrate the effects of the first aspect of the present invention.

Figure 7:
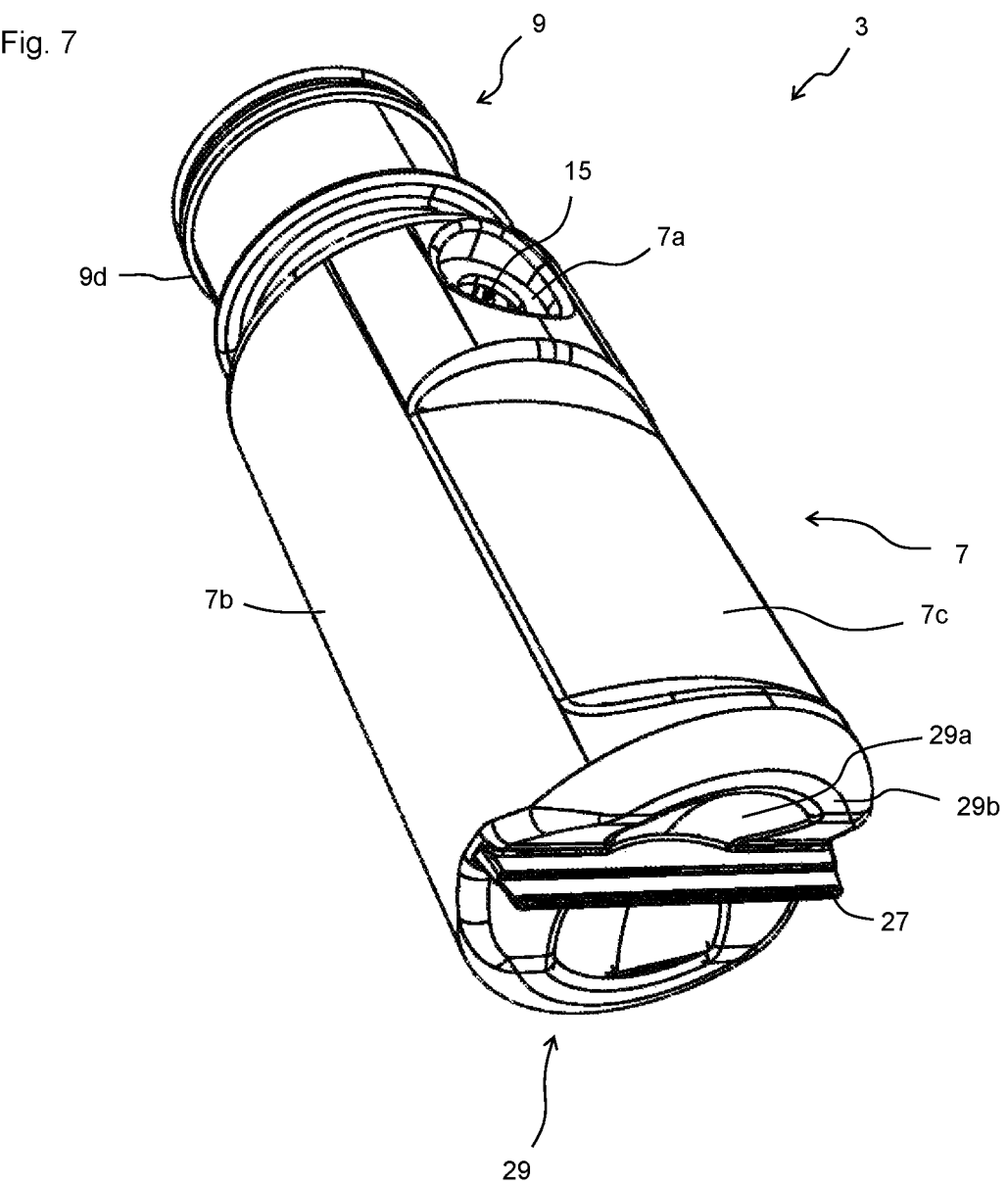
FIG. 7 is a perspective view of a container body 3 of a delaminatable container 1 in another embodiment of the present invention.

Delaminatable container bodies having a layer structure of outer layer (LDPE layer)/inner layer (EVOH layer/adhesion layer/innermost layer) and having the shape same as FIG. 7 were formed by blow molding. The resin composition of the innermost layer was as shown in Table 1. Other details were as below.
Diameter of mouth: 18 mm.
Volume of delaminatable container body: 15 mL.
Thickness of outer layer: 0.45 mm.
Thickness of inner layer: 0.15 mm (EVOH layer: 0.03 mm, adhesion layer: 0.03 mm, innermost layer: 0.09 mm)
LDPE: Suntec F2206
EVOH: SoarnoL ST230
Adhesion layer: ZELAS MC721APR5
COP: ZEONEX 5000 (cycloolefin polymer having cyclopentane structure in main chain)
SEBS: Tuftec H1051
PET: KURAPET KS710B-8S
PP: EXCELLEN FH3711F6

The delaminatable container bodies thus produced were subjected to the following evaluation and the results are collectively shown in Table 1. As shown in Table 1, in all Examples, excellent results were obtained for all evaluation items.

From the perspective of adsorption of chemicals, the less ratios of the SEBS in Examples were preferred because the amount of chemical adsorption was smaller. In particular, the ratio of the SEBS of 30% or less was preferred because the SEBS was uniformly dispersed in the COP to readily form a sea-island structure and the amount of chemical adsorption was closer to that of the COP alone. In other words, the elastomer ratio is particularly preferably 0.5 or less.

<Tensile Modulus of Elasticity>

For the resin contained in the inner layer, the tensile modulus of elasticity was measured in accordance with ISO 527.

<Squeezability>

The inner layer of each delaminatable container body was subjected to preliminary delamination from the outer layer and set in a state of directing the mouth 9 downwardly. A Φ 16 mm board was then fixed to an opposite surface of the panel portion 7c and pressed from the a panel portion 7c side by a push-pull gauge to measure a squeezing force necessary for pressing 15 mm. Based on the squeezing force thus measured, the squeezability was evaluated by the following criteria.
⊙: Squeezing force ≤28 N
○: 28 N<Squeezing force ≤32 N
x: 32 N<Squeezing force <Drop Breaking Resistance>

Each delaminatable container body was filled with 10 mL of water and was tightly closed by an aluminum seal. After that, it was left in a 5° C. thermostatic chamber for 48 hr. or more, and from a dropping height of 1.5 m, it was dropped 5 times in a state of vertically standing the container body and 5 times in a state of horizontally laying the container body. After that, the state of damage in the container body was visually checked to evaluate the drop breaking resistance. The test was performed for ten samples, and the drop breaking resistance where damage was found in one or more container bodies was defined as x and the drop breaking resistance where no damage was found in all samples was defined as ○. In Comparative Example 1, pinholes were found near the parting line on the bottom in one sample. In Comparative Example 4, pinholes were found near the fresh air inlet after horizontal dropping in three samples.

TABLE 1

|  |  | Examples | | | | Comparative Examples | | | |
|---|---|---|---|---|---|---|---|---|---|
|  |  | 1 | 2 | 3 | 4 | 1 | 2 | 3 | 4 |
| Resin Composition of Innermost Layer | COP | 80 | 70 | 60 | 50 |  |  |  |  |
|  | SEBS | 20 | 30 | 40 | 50 |  |  |  |  |
|  | LDPE |  |  |  |  | 100 |  |  |  |
|  | PET |  |  |  |  |  | 100 |  |  |
|  | PP |  |  |  |  |  |  |  | 100 |
| Evaluation | Elastomer Ratio | 0.25 | 0.43 | 0.67 | 1 | 0 | 0 | 0 | 0 |
|  | Tensile Modulus of Elasticity (MPa) | 1600 | 1400 | 1150 | 950 | 2100 | 250 | 2300 | 700 |
|  | Squeezability | ⊙ | ⊙ | □ | □ | □ | □ | □ | □ |
|  | Drop Breaking Resistance | ○ | ○ | ○ | ○ | □ | ○ | ○ | □ |
|  | Non-Transmittance of Water Vapor | □ | □ | ○ | ○ | □ | □ | □ | □ |

<Non-Transmittance of Water Vapor>

Each delaminatable container body was filled with 10 mL of water and was tightly closed by an aluminum seal. After that, it was stored in a thermostatic chamber in the conditions of 20° C.×60% RH and the amount of water vapor transmission in storage for two weeks was measured. From the amount of water vapor transmission thus measured, the water vapor transmission rate (=amount of water vapor transmission/10 mL) was calculated to evaluate the non-transmittance of water vapor by the following criteria.
⊙: Water vapor transmission rate ≤0.025%
○: 0.025<Water vapor transmission rate ≤0.030%
x: 0.030%<Water vapor transmission rate

REFERENCE SIGNS LIST

1: Delaminatable Container, 3: Container Body, 4: Valve Member, 5: Tube, 6: Mobile Part, 7: Storage Portion, 9: Mouth, 11: Outer Layer, 12: Outer Shell, 13: Inner Layer, 14: Inner Bag, 15: Fresh Air Inlet, 21: Intermediate Space, 23: Cap, 27: Bottom Sealing Portion, 33: Inlet peripheral delaminated region, 34: Undelaminated region

The invention claimed is:

1. A delaminatable container, comprising a container body having an outer shell and an inner bag, the inner bag to be shrunk with a decrease in contents, wherein
    the inner bag is composed of an inner layer including a mixed resin layer, an adhesion layer, and an EVOH layer in this order from inside of the container,
    the mixed resin layer is formed of a mixed resin containing a cycloolefin polymer and a styrene-based thermoplastic elastomer.

2. The container of claim 1, wherein, in the mixed resin, a mass ratio of the styrene-based thermoplastic elastomer to the cycloolefin polymer is from 0.1 to 2.

3. The container of claim 1, wherein the styrene-based thermoplastic elastomer is formed of a hydrogenated styrene-based copolymer.

4. The container of claim 3, wherein the hydrogenated styrene-based copolymer contains a styrene-ethylene butylene-styrene block copolymer.

5. A delaminatable container, comprising a container body having an outer shell and an inner bag, the inner bag delaminated from the outer shell to be shrunk with a decrease in contents, wherein the outer shell includes a fresh air inlet communicating an external space of the container body with an intermediate space between the outer shell and the inner bag, an undelaminated region where the inner bag is not delaminated from the outer shell is provided to surround the fresh air inlet,
    an inlet peripheral delaminated region, where the inner bag is delaminated from the outer shell, is provided between the undelaminated region and the fresh air inlet, and
    a value obtained by dividing an area of the inlet peripheral delaminated region by an area of an interface region between the outer shell and the inner bag is 0.01 to 0.5 at a stage before the inner bag is charged with the contents.

6. The container of claim 5, further comprising a cover to close the fresh air inlet.

7. The container of claim 5, further comprising a valve member to regulate entrance and exit of air between the intermediate space and the external space.

8. The container of claim 5, wherein the undelaminated region is provided in an interface region, other than the inlet peripheral delaminated region, between the outer shell and the inner bag.

9. The container of claim 5, wherein the container body includes a storage portion to store the contents and a mouth to discharge the contents from the storage portion, the fresh air inlet is provided in the storage portion.

* * * * *